(12) United States Patent
Harris et al.

(10) Patent No.: US 6,990,322 B2
(45) Date of Patent: Jan. 24, 2006

(54) METHOD AND APPARATUS FOR LOCOMOTIVE RADIO COMMUNICATIONS, WITH EXPANSION CAPABILITY

(75) Inventors: Jeff Harris, Palm Bay, FL (US); William Neeley, Melbourne, FL (US); Brian Schroeck, Melbourne, FL (US); Scot Stewart, Indiatlantic, FL (US)

(73) Assignee: General Electric Company, Schenectady, NY (US)

( * ) Notice: Subject to any disclaimer, the term of this patent is extended or adjusted under 35 U.S.C. 154(b) by 691 days.

(21) Appl. No.: 10/021,233

(22) Filed: Oct. 30, 2001

(65) Prior Publication Data

US 2003/0080257 A1 May 1, 2003

(51) Int. Cl.
*H04B 1/034* (2006.01)

(52) U.S. Cl. .......... 455/97; 455/90.3; 455/99; 455/457; 455/411; 455/405; 246/167 R; 246/166.1

(58) Field of Classification Search ............ 455/99, 455/457, 66, 411, 405, 435, 458, 436, 445, 455/450, 90.3, 97, 66.1; 246/167 R, 166.1
See application file for complete search history.

(56) References Cited

U.S. PATENT DOCUMENTS 3,668,526 A * 6/1972 Raskin .............. 455/18
4,582,280 A 4/1986 Nichols et al.
5,039,038 A 8/1991 Nichols et al.
5,455,823 A * 10/1995 Noreen et al. ............ 370/312
5,785,283 A 7/1998 Ehrenberger et al.
5,786,998 A 7/1998 Neeson et al.
5,969,643 A 10/1999 Curtis
6,041,216 A * 3/2000 Rose et al. ................ 455/9
6,230,086 B1 5/2001 Oguma et al.
6,272,344 B1 * 8/2001 Kojima ................ 455/435.1
6,374,307 B1 * 4/2002 Ristau et al. ............ 709/249
6,591,096 B2 * 7/2003 Ezuriko .................. 455/411
2002/0009978 A1 * 1/2002 Dukach et al. ............ 455/99

* cited by examiner

*Primary Examiner*—Lee Nguyen
*Assistant Examiner*—Minh D. Dao
(74) *Attorney, Agent, or Firm*—William Scott Andes; John L. DeAngelis, Jr.; Beusse Brownlee Wolter Mora & Maire, P.A.

(57) ABSTRACT

An apparatus and method for equipping a locomotive with a modular radio communication system capable of being expanded to incorporate future improvements in radio and data communication electronics. The modular radio communication system provides for the installation of a standardized mounting plate and housing onto the rooftop of the locomotive to reduce the need to make extensive mechanical and electrical modifications to the locomotive when the radio communications system is updated. Sunscreens and vent openings in the standard mounting plate and housing work to reduce the temperature of the internal components of the modular radio communications system.

25 Claims, 3 Drawing Sheets

US 6,990,322 B2

METHOD AND APPARATUS FOR LOCOMOTIVE RADIO COMMUNICATIONS, WITH EXPANSION CAPABILITY

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates to a radio communication system for locomotives, and in particular, to a locomotive radio communication system which allows for upgrading on-board radio communications systems without the need for extensive removal and replacement of a large number of communication system components.

Many locomotives used in the railroad transportation industry are equipped with radio communication systems. In addition to the current widespread use of voice radio communications, the need for wireless data communications to and from locomotives is expected to increase substantially over the next several years. It is likely that in the near future, all locomotives will be equipped with some type of radio data communication system.

While locomotive radio data communications systems currently exist, this technology is still in development. These recent developments are resulting in significant and rapid changes in design and implementation. The constant changes which are occurring preclude specific long term communication requirements from being accurately defined today. Therefore, while there is a present need to equip locomotives with radio data communication systems, it is impossible to determine the exact configuration of future radio communication systems.

The conventional process of installing a radio communication system onto a locomotive requires installing a radio, an antenna, an RF coaxial cable connecting the radio to the antenna, and the interface cabling between the radio and the application equipment. This installation involves finding a suitable location inside the locomotive for the radio and a suitable location on the roof for the antenna. The radio mounting brackets are fitted in the cab, an access hole is drilled in the roof, coaxial cable is run from the radio through the cab to the roof, the antenna is installed, and appropriate connections are made. This current process is very costly because of the man hours of labor required, and the non-productive downtime of the locomotive.

BRIEF SUMMARY OF THE INVENTION

Briefly stated, the current invention seeks to solve the problem of how best to meet the railroad industry's near term needs for radio communication services that are definable today, while at the same time, providing the customer with equipment that can be quickly upgraded at a later time with additional and/or improved functionality, and without extensive changeover efforts. The present invention describes an apparatus and method in which currently available radio data communications systems are installed in locomotives in a manner which greatly simplifies the expansion or modification of those radio communications systems in the future.

This invention uses a complete locomotive cab rooftop assembly which allows for several sets of radios and antennas. In its initial installation, the expandable communication system is equipped with only one or two radio communication devices, including the antennas. The installation of the expandable radio communication system is easier than the conventional retrofit installation of a single radio and antenna because the RF coaxial cable is not routed through the cab to the roof. Moving the radio to the roof, and eliminating the coaxial cable routing into the cab allows for flexible positioning of the cab electronics unit, as the cable length and bending limits of the coaxial cable no longer apply.

The foregoing and other objects, features, and advantages of the invention, as well as presently preferred embodiments thereof, will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
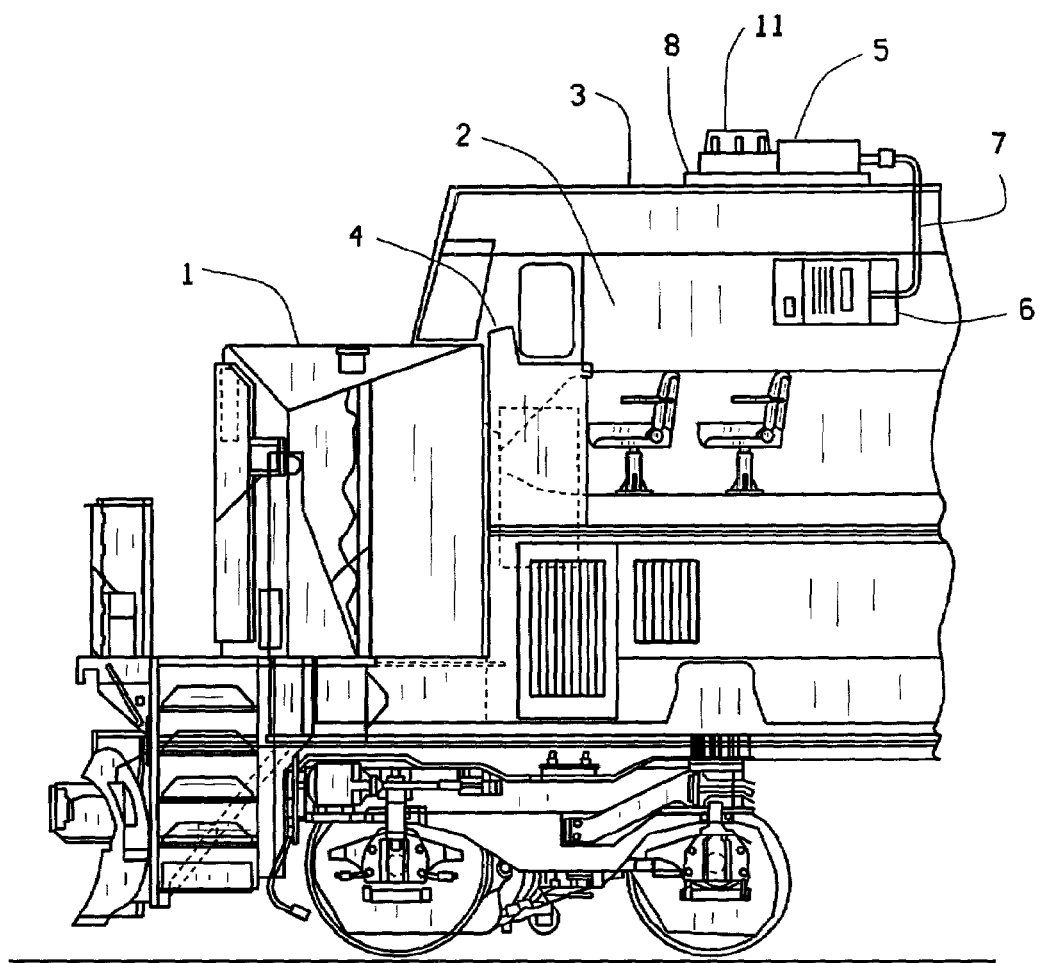
FIG. 1 is side view of a locomotive showing the general arrangement of the present invention when installed.

Referring now to the drawings, FIG. 1 shows the typical installation of the present invention on a locomotive 1. Each locomotive 1 used in the railroad industry is equipped with a cab 2 in which the locomotive operator resides. The cab 2 has a roof 3 which encloses the operator and a set of locomotive controls 4 from the elements. A modular radio communications unit 5 is connected to a radio communications hub 6.

Modular radio communications unit 5 is attached to a standard mounting plate 8 which is attached to the roof 3 of the locomotive 1. The standard mounting plate 8 is attached to the roof with bolts, rivets, or by welding, or any other suitable means which securely mounts the standard mounting plate 8 to roof 3. In an alternate embodiment, standard mounting plate 8 is designed to also accommodate high gain steered antenna systems that utilize Ku-band or Ka-band mobile antennas.

Figure 2:
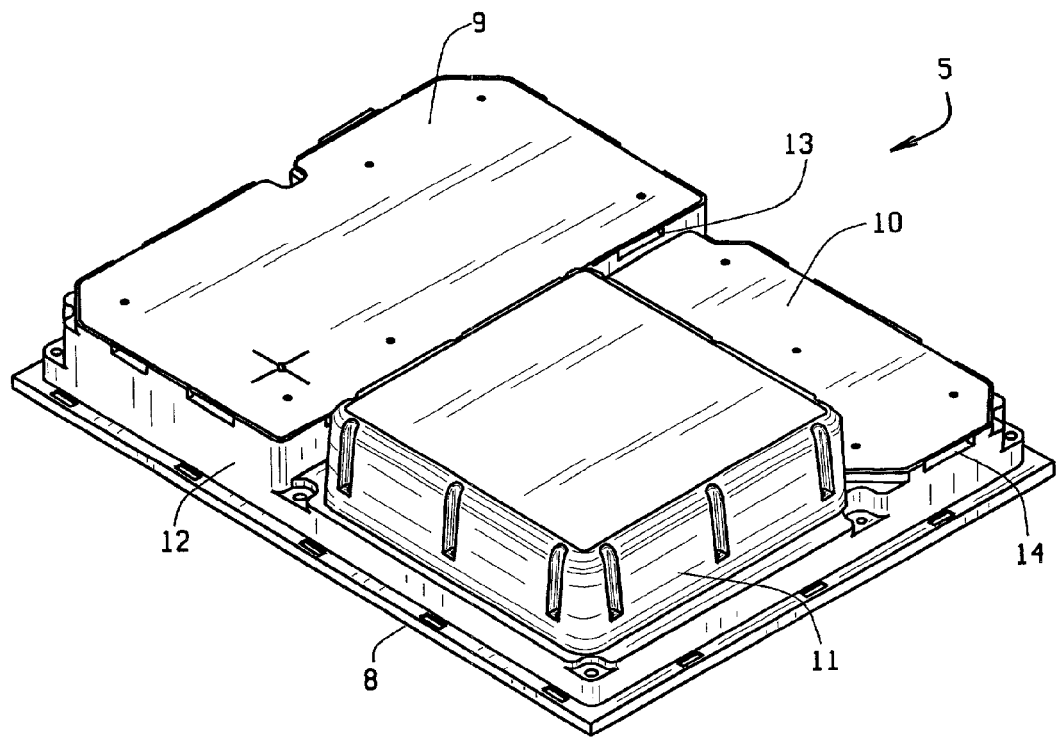
FIG. 2 is perspective view of the present invention showing the roof mounted radio communications system.

The modular radio communications unit 5 (FIG. 2) comprises a first sunscreen 9, a second sunscreen 10, an antenna dome 11, a housing 12, and standard mounting plate 8. The sunscreens act to prevent the radio electronics within housing 12 from being directly exposed to the intense solar heat normally found on the roof of the locomotive. To further cool the radio electronics, housing 12 has a first plurality of vent openings 13 and a second plurality of vent openings 14. These vent openings allow air to flow beneath sunscreens 9 and 10. This air flow acts to further dissipate the solar heat.

Figure 4:
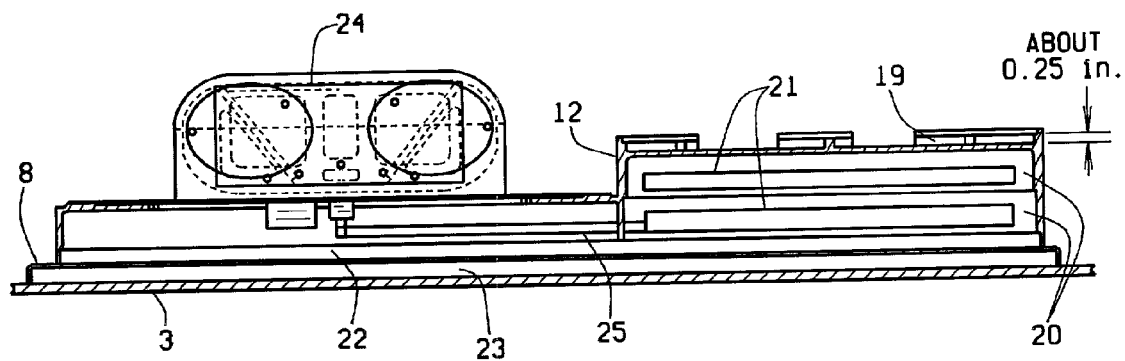
FIG. 4 is a side sectional view of the present invention with the antenna dome removed.
Figure 3:
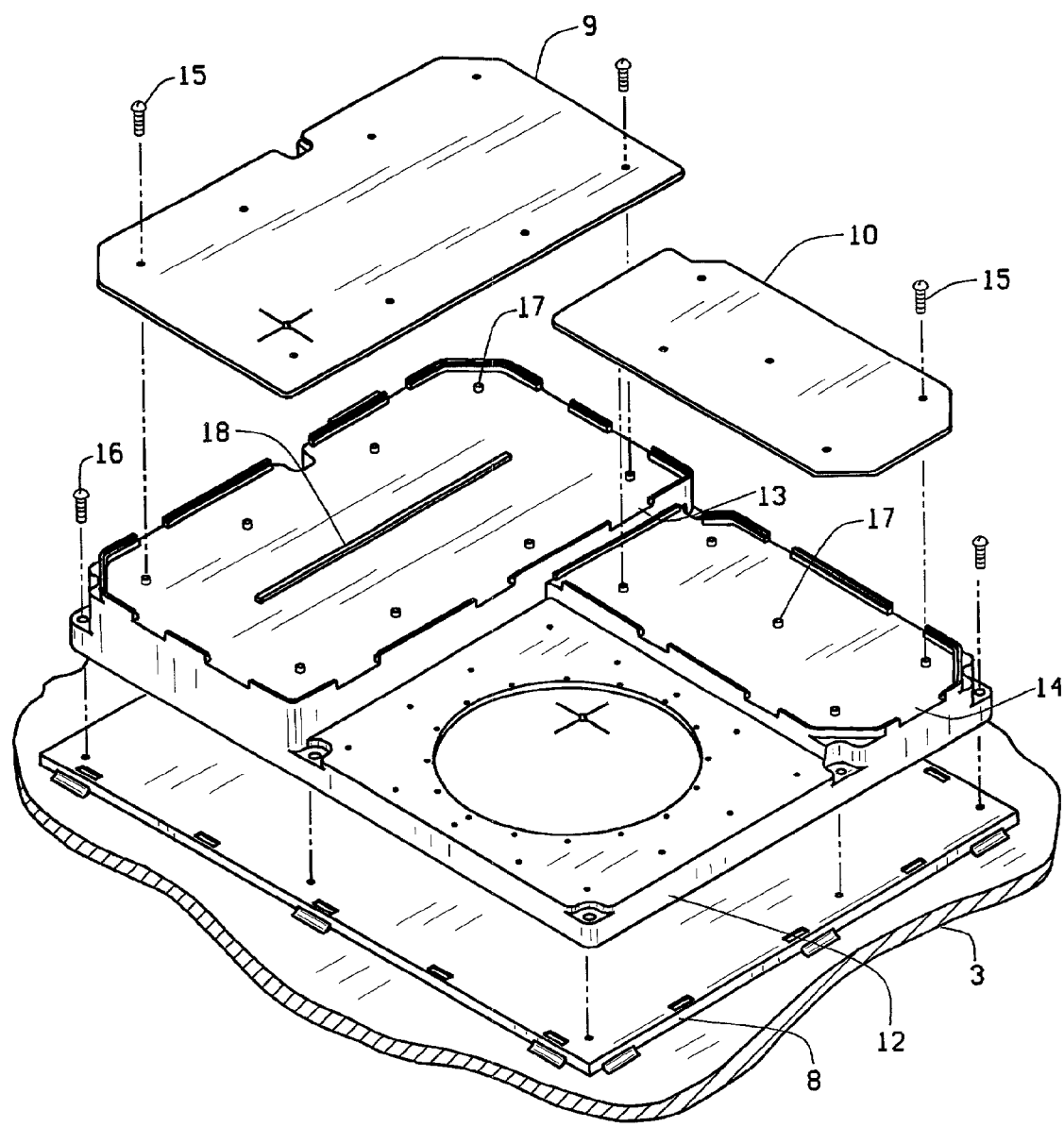
FIG. 3 is an exploded perspective view of the present invention showing the sunscreens.

The sunscreens 9 (FIG. 3) and 10 are attached to housing 12 by a first plurality of mounting screws 15. The housing is attached to standard mounting plate 8 by a second plurality of mounting screws 16. The housing 12 includes a plurality of risers 17 and a spacer 18. The risers and the spacer hold the sunscreens 9 and 10 above housing 12 to allow air to enter the housing through vent openings 13 and 14. The air cools the modular radio communications unit 5 by circulating between the sunscreens 9 and 10, and housing 12 to dissipate heat absorbed by the housing. An air ventilation gap 19 (FIG. 4) is created by risers 17 and spacer 18. The air ventilation gap 19 is about 0.25 inches in height.

Housing 12 has a first insulating air gap 22 and standard mounting plate 8 has a second insulating air gap 23. The insulating air gaps 22 and 23 trap air within the housing 12. This trapped air acts as insulation to inhibit propagation of heat from roof 3 of the locomotive 1 into the housing.

The housing also has at least two radio electronics compartments 20. Using appropriate fasteners, at least one radio electronics unit 21 is installed within one of the radio electronics compartment 20. An antenna 24 is mounted on top of housing 12. Antenna dome 11 is installed onto housing 12 to protect antenna 24. While modular radio communications unit 5 may initially include only one radio electronics unit 21 and one antenna 24, additional radio electronic units 21 and additional antennas 24 may subsequently be incorporated within the modular communications unit. Radio electronics units 21 may be an individual unit, or interconnected with other radio electronics units in the housing 12. The actual number of initially installed radio electronics units 21 will be in accordance with the particular needs of the railroad company.

Antenna 24 is connected to radio electronics units 21 using an RF coaxial cable 25. Connections of antenna 24 to radio electronics units 21 are made in or near modular radio communications unit 5 and do not require the routing of the RF coaxial cable 25 through roof 3. This eliminates the need to drill holes in the roof 3 as is required when a conventional radio system is installed on the locomotive. This also reduces radio and antenna placement problems caused by the limitations on the length and the bending limits of coaxial cable.

The communications hub 6 (FIG. 1), such as the General Electric Harris Pathfinder®, is installed within cab 2 of the locomotive. The communications hub 6 is connected to the roof mounted modular radio communications unit 5 by a standard multichannel highband width baseband serial cable 7. Cable 7 allows communications between radio electronics units 21 and communications hub 6. Cable 7 also provides power to the modular radio communications unit 5. It is important to note that cable 7 is the only cable routed through the roof 3 of the cab 2, thereby eliminating the need to drill several holes in the roof for multiple antenna cables and power cables every time the radio on locomotive 1 is replaced or upgraded.

In operation, the present invention functions in a manner similar to all two-way radio communication devices and will allow for the possibility of both voice and data communications. To enhance these communications, a unique locomotive registration number assigned to a specific locomotive is stored in the communications hub 6. The modular radio communications unit 5 contains baseband interface modules, factory integrated to the radio electronics units 21, that translate the radio baseband protocol to the standard protocol of communications hub 6. The translation provided by the baseband interface modules also contains a factory programmed unique radio identification code. A host data center located at a railroad service center monitors the radio communications from locomotive 1. The unique locomotive registration number and the unique radio identification code allow for automatic commissioning of any radio upgrade when locomotive 1 is in a location that provides a radio communication path to the host data center.

The full benefit of the invention is realized when the next generation of radio communication requirements are to be met and the older radio(s) installed within the modular radio communications unit 5 must be replaced with new radios designed to meet the new radio communications requirements. The modular radio communications unit 5 is simply removed from the standard mounting plate 8 and exchanged for a model with the desired new capabilities. The replacement steps consists of disconnecting the serial cable 7 from the obsolete modular radio communications unit 5, removing the obsolete modular radio communications unit 5, installing the new modular radio communications unit 5, and reconnecting the serial cable 7. It is estimated that this task could be performed in thirty minutes by a semi-skilled single technician while locomotive 1 is being serviced between trips.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A locomotive radio communication system for a railroad locomotive having a cab with a roof, comprising:
   a standard mounting plate;
   a roof-mounted modular radio communications unit carried on the plate for mounting the unit on the roof of the cab, and;
   a cab-mounted communications hub disposed within the cab for controlling the modular radio communications unit via baseband signals exchanged between the modular radio communications unit and the communications hub via a base band conductor.

2. The locomotive radio communication system of claim 1 wherein the modular radio communications unit includes a housing.

3. The locomotive radio communication system of claim 2 wherein the housing has at least two radio electronic compartments and at least one antenna.

4. The locomotive radio communication system of claim 3 further comprising at least one radio electronics unit.

5. The locomotive radio communication system of claim 4 wherein the at least one radio contains at least one baseband interface module integrated into the radio, the baseband interface module being capable of translating a radio baseband protocol to a standard communications hub protocol.

6. The locomotive radio communication system of claim 5 wherein the at least one radio electronics unit is mounted within the housing.

7. The locomotive radio communication system of claim 6 wherein the modular radio communications unit is connected to the communications hub by a serial cable.

8. The locomotive radio communication system of claim 7 wherein the at least one baseband interface module contains a factory programmed unique radio identification code.

9. The locomotive radio communication system of claim 7 wherein the modular radio communications unit contains at least one radio capable of both voice and data communications.

10. The locomotive radio communication system of claim 7 further comprising an RF coaxial cable connecting the at least one radio to the at least one antenna such that the RF coaxial cable is positioned solely outside the cab of the locomotive.

11. The locomotive radio communication system of claim 7 wherein the communications hub contains a unique registration code identifying a specific locomotive.

12. The locomotive radio communication system of claim 11 wherein the at least one baseband interface module contains a factory programmed unique radio identification code.

13. The locomotive radio communication system of claim 12 wherein a host data center utilizes the unique radio identification code to allow for automatic remote commissioning of a radio upgrade.

14. The locomotive radio communication system of claim 2 wherein the housing has a first sunscreen and a second sunscreen to shield the modular communications unit from the sun.

15. The locomotive radio communication system of claim 14 further comprising a plurality of vent openings disposed below the first and the second sun screens to allow air to circulate within the housing.

16. The locomotive radio communication system of claim 14 wherein the housing has an insulating air gap to trap air beneath the housing.

17. The locomotive radio communication system of claim 16 wherein the modular radio communications unit contains at least one radio capable of both voice and data communications.

18. The locomotive radio communication system of claim 17 further comprising an RF coaxial cable connecting the at least one radio to the at least one antenna such that the RF coaxial cable is positioned outside the cab of the locomotive.

19. A locomotive radio communication system, wherein the locomotive comprises a cab with a roof, the locomotive communication system comprising:
a modular radio communications unit having a standard mounting plate being capable of attachment to the roof of the locomotive, the modular radio communications unit having a housing with a first sunscreen, a second sunscreen, at least one air insulation gap, at least two radio electronics compartments, a first plurality of vent openings, and a second plurality of vent openings, the first and second plurality of vent openings configured to create an air ventilation gap;
at least one radio electronics unit mounted within the housing;
at least one antenna mounted to the housing, the antenna being covered by an antenna dome;
an RF coaxial cable connecting the at least one radio electronics unit to the at least one antenna, wherein the RF coaxial cable is disposed entirely outside of the locomotive cab and;
a communications hub disposed in the locomotive cab and connected to the modular radio communications unit for controlling the modular radio communications unit through a multichannel high bandwidth baseband serial cable.

20. A method of creating a locomotive radio communication system for a railroad locomotive having a cab with a roof, comprising:
installing a standard mounting plate capable of being mounted to the roof of the cab;
preparing a modular radio communications unit having a housing containing at least one radio;
installing the housing onto the standard mounting plate;
installing a least one antenna on the housing;
connecting the at least one antenna to the at least one radio with an RF coaxial cable;
installing a communications hub inside the cab of the locomotive, and;
connecting the communications hub to the at least one radio in the housing with a multichannel high bandwidth baseband serial cable capable of communicating with the at least one radio and also capable of supplying operating power from the communications hub to the at least one radio.

21. The method of claim 20 including designing the at least one radio to contain at least one baseband interface module integrated into the radio, the baseband interface module being capable of translating a radio baseband protocol to a standard communications hub protocol.

22. The method of claim of 21 including preparing the housing to have at least one sunscreen and a plurality of vent openings to reduce the temperature of the components of the modular radio communications unit.

23. The method of claim 21 including designing the communications hub to have a unique registration code identifying a specific locomotive.

24. The method of claim 21 including designing the at least one baseband interface module to have a factory programmed unique radio identification code.

25. The method of claim of 24 including preparing the housing to have at least one sunscreen and a plurality of vent openings to reduce the temperature of the components of the modular radio communications unit.

* * * * *